United States Patent [19]
Walters

[11] 3,896,676
[45] July 29, 1975

[54] SPEEDOMETER DRIVE CONSTRUCTION
[75] Inventor: Leslie K. Walters, Rochester, Mich.
[73] Assignee: General Motors Corporation, Detroit, Mich.
[22] Filed: June 17, 1974
[21] Appl. No.: 479,782

[52] U.S. Cl. .................. 74/12; 74/198; 74/798
[51] Int. Cl. ... F16h 37/00; F16h 15/08; F16h 13/06
[58] Field of Search.................. 74/12, 198, 798

[56] References Cited
UNITED STATES PATENTS
3,097,539  7/1963  Opocensky ..................... 74/198
3,727,473  4/1973  Bayer ........................... 74/198

Primary Examiner—Leonard H. Gerin
Attorney, Agent, or Firm—John P. Moran

[57] ABSTRACT

A speedometer drive construction including improved structure for mounting, clamping, and adjusting a speedometer drive housing and an associated planetary traction drive arrangement on a transmission extension housing and in cooperation with a transmission output shaft extending therethrough.

2 Claims, 7 Drawing Figures

SPEEDOMETER DRIVE CONSTRUCTION

This invention relates generally to variable speed ratio-type automotive speedometer drive arrangements and, more particularly, to improved mounting, clamping, and adjusting structure therefor.

Inasmuch as speedometer accuracy requirements are becoming increasingly more stringent and, hence, extremely difficult to attain at assembly in view of the countless combinations of tire sizes and axle ratios, and equally difficult to maintain over the life-time of an automobile in view of normal tire wear and dimensional tolerances of new tires, readily adjustable traction-drive type speedometer arrangements are currently being proposed. For example, see copending application of Lubomyr O. Hewko, Ser. No. 478,843, entitled "Speedometer Drive Arrangement".

An object of this invention is to provide improved mounting, clamping and adjusting structure for use with a planetary traction-drive type speedometer drive arrangement of the aforementioned type taught by Hewko.

Another object of the invention is to provide an improved speedometer drive construction for mounting in a circular, counterbored opening formed on a transmission extension housing and comprising an adapter plate including a body portion having a radial flange and a retention tab formed thereon, the radial flange being seated in the counterbore and the body portion being confined freely within the circular opening, a circular speedometer drive housing having a concentric guide ring formed thereon and mounted in the counterbore on the radial flange of the adapter plate with the guide ring being confined freely within the body portion thereof, a circular, bowed clamp having a pair of oppositely disposed tabs extending from the outer peripheral edge thereof and a pair of parallel redges formed at the respective radially inner edges of the pair of tabs, with one of the tabs being confined in a slot formed in the extension housing and the other tab, along with the retention tab of the adapter plate, being secured to the extension housing by a bolt, thereby forcing the parallel ridges into abutting engagement with the speedometer drive housing; and a reaction member including a socket for retaining a traction drive-ball at a predetermined fixed location between the transmission output shaft and a race of a planetary traction-drive unit, the reaction member being secured to the body portion of the adapter plate and being shaped so as to extend beyond and around the outer surface of the planetary traction-drive unit to hold the traction drive-ball at the selected intermediate location.

These and other objects and advantages of the invention will be apparent when reference is made to the following description and accompanying drawings, wherein.

Figure 1:
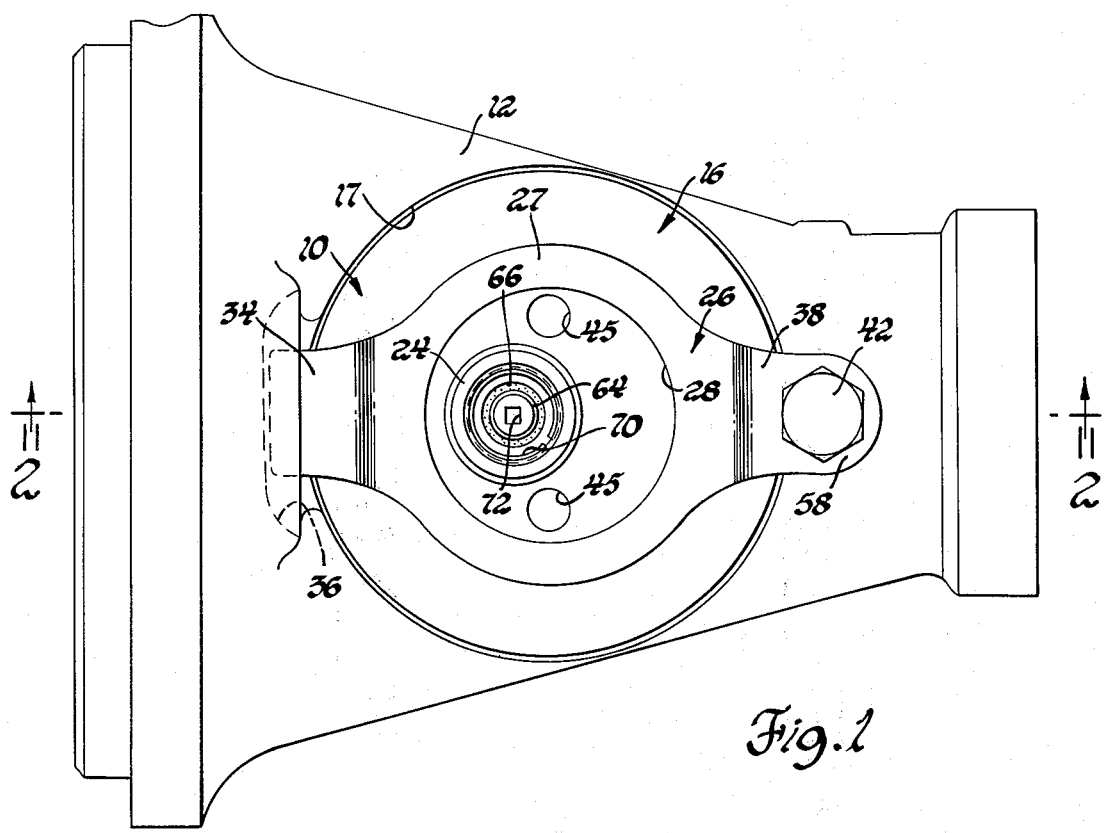
FIG. 1 is a top view of an automotive transmission extension housing embodying the invention.
Figure 2:
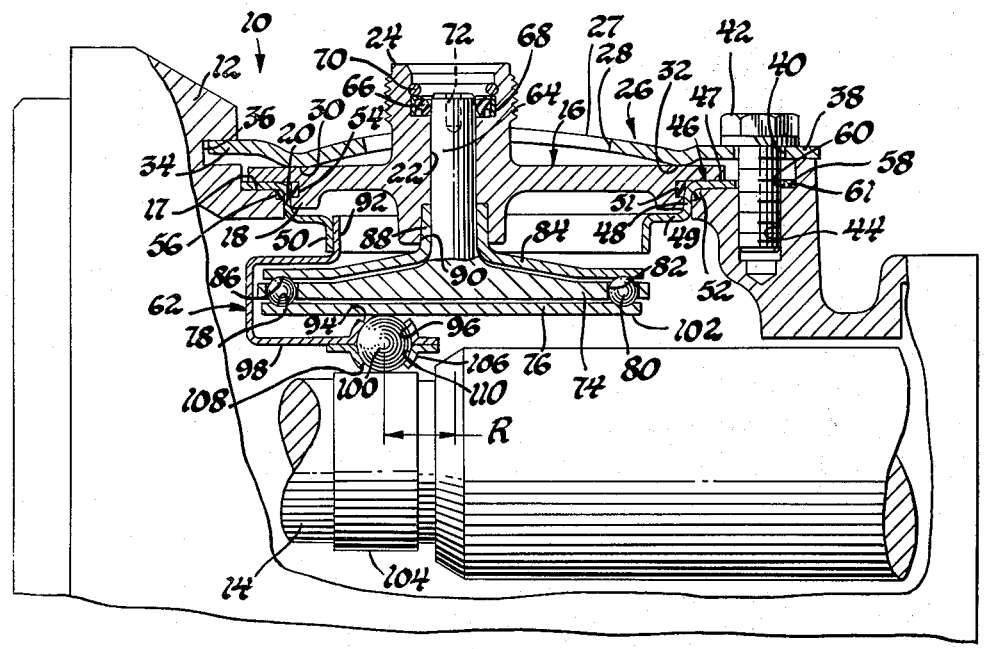
FIG. 2 is a fragmentary cross-sectional view taken along the plane of line 2—2 of FIG. 1, and looking in the direction of the arrows.

Referring now to the drawings in greater detail, FIGS. 1 and 2 illustrate an accessory transmission 10, such as a vehicular speedometer drive arrangement, adapted to being mounted in a vehicular transmission extension housing or case 12 for use with a transmission output shaft 14.

The speedometer drive arrangement 10 includes a circular housing 16 mounted in a flat-bottom surfaced counterbore 17 formed in the transmission case 12 and having a guide ring 18 rotatably mounted in a side opening 20 formed in the transmission case 12. An opening 22 is formed through a shaft-retention extension 24 formed eccentrically on the circular housing 16.

An improved clamping device 26 is used to secure the speedometer drive housing 16 with respect to the transmission extension housing 12. The clamping device 26 includes a central body portion 27 which is substantially circular and formed to include a central concentric opening 28 therein substantially larger in diameter than the off-set shaft-retention extension 24 of the housing 16, suitable for rotary movement of the latter through one complete revolution during an adjustment process, to be described. As may be noted in FIG. 2, the clamping device 26 is bowed across the central body portion 27, with parallel abutment ridges 30 and 32 formed on opposite sides of the opening 28 for abutting against the adjacent upper surface of the housing 16. A first tab or extension 34 is formed on an edge of the clamping device 26, extending radially outwardly from the ridge 30 for insertion into a slot or groove 36 formed in the extension housing 12, while a second tab or extension 38 is formed on an opposite edge of the clamping device 26, extending radially outwardly from the ridge 32 and including an opening 40 formed therethrough. A bolt or screw 42 is mounted through the opening 40 for being threadedly connected to a threaded opening 44 formed in the extension housing 12.

A pair of oppositely disposed ratio-adjustment holes 45 (FIG. 1) are formed in the upper surface of the housing 16, within the confines of the opening 28 in the clamping device 26, in an equally-spaced relationship with the off-center extension 24 of the housing 16.

An adapter plate 46 is formed to include a radial flange 47 for seating on the bottom surface of the counterbore 17, a first cylindrical portion 48 formed on the inner peripheral edge of the radial flange 47, a radial wall 49 formed on the first cylindrical portion 48 so as to extend radially inwardly therefrom, and a second cylindrical portion 50 formed on the inner peripheral edge of the radial wall 49 so as to extend therefrom in the direction opposite to that of the first cylindrical portion 48. Thus, it may be noted in FIG. 2 that the radial flange 47 and the first cylindrical portion 48 of the adapter plate 46 are both confined between the housings 12 and 16, in a stepped relationship therewith.

Figure 3:
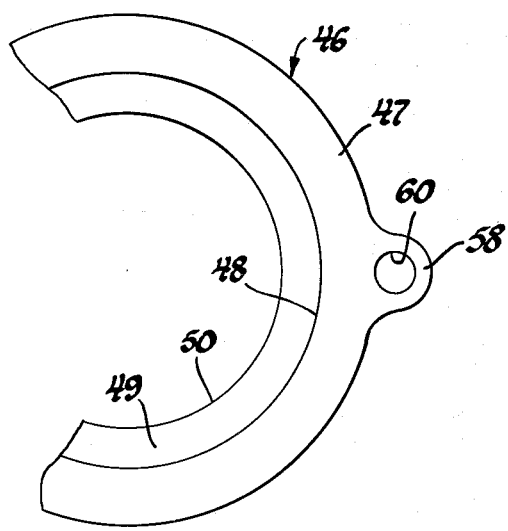
FIGS. 3–7 are plan views of various components of the inventive structure.

A pair of suitable O-ring seals 51 and 52 (FIG. 2) are mounted in respective annular grooves 54 and 56 formed in outer and inner adjacent surfaces of the housings 16 and 12, respectively. A tab 58 (FIG. 3), having an opening 60 formed therethrough, is formed on the outer edge of the radial flange 47 and mounted in an extension or pocket 61 of the counterbore 17 such that the opening 60 is aligned with the threaded opening 44. A reaction member 62 is secured to the inner surface of the second cylindrical portion 50 of the adapter plate 46 for a purpose to be described.

A shaft 64, such as a speedometer take-off shaft, is mounted through the opening 22 of the off-center extension 24 of the housing 16, and is rotatably supported by a seal 66 mounted in a counterbore 68 formed in the housing extension 24 at the exposed end of the opening 22. The seal 66 is retained axially in the counterbore 68 by a retainer ring 70. Suitable fitting means, such as a square or hexagonal opening 72, is formed in the exposed end of the take-off shaft 64 for the connection therewith of a conventional speedometer cable [not shown].

Figure 4:
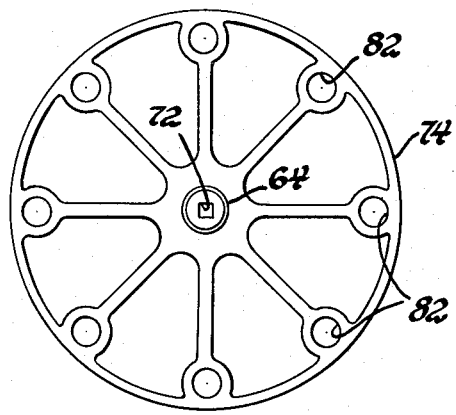
Figure 5:
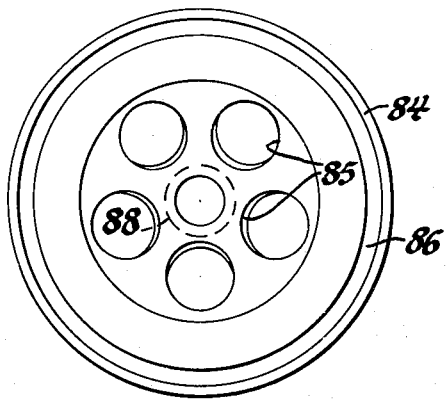

A relatively large flange 74 of a predetermined diameter is formed on an end of the take-off shaft 64 within the transmission case 12. A disc 76, having an annular groove 78 formed adjacent the outer periphery thereof, is mounted perpendicular to the take-off shaft 64 axis, adjacent the face of the flange 74, with a plurality of balls 80 mounted in the annular groove 78 formed in the disc 76. The balls 80 are also confined in equally-spaced openings 82 (FIG. 4) formed adjacent the outer periphery of the flange 74. A contoured, belleville spring-type wall 84 may include a plurality of equally-spaced openings 85 (FIG. 5) formed at an intermediate location thereof to provide the proper resilience therein. An annular groove 86 is formed adjacent the outer periphery of the wall 84 to provide a track for the balls 80, and a sleeve-like extension 88 is formed at the center of the wall 84 and secured in a counterbore 90 formed in the housing 16 at the inner end of the shaft extension opening 22. Thus it may be realized that the disc 76, the balls 80, the flange 74, and the wall 84 serve as a race or ring, planets, a carrier, and a reaction race or sun, respectively, of a planetary unit which provides a 2:1 speed reduction between any input at the race 76 and the resultant output at the carrier 74 and the latter's associated shaft 64.

Figure 6:
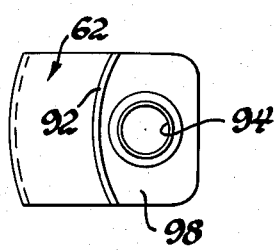
Figure 7:
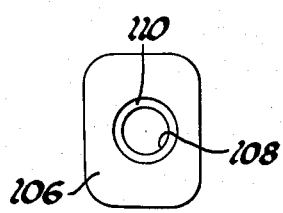

Referring now to FIG. 6, it may be noted that the reaction member 62 is formed to include an arcuate flange 92 of a predetermined length which is secured in any suitable manner, such as welding, to the inner surface of the innermost cylindrical portion 50 of the adapter plate 46, as indicated above. An opening 94, including a spherical seat 96 (FIG. 2), is formed in a radially inwardly extending flat support arm 98 of the reaction member 62 and serves as a means for operatively mounting a traction drive-ball 100 between the adjacent outer surface 102 of the disc or race 76 and a predetermined peripheral surface 104 of the transmission output shaft 14. A retainer member 106, substantially rectangular in shape, as illustrated in FIG. 7, has an opening 108, including a spherical seat 110, formed therethrough. The retainer member 106 is secured in any suitable manner to the support arm 98, such that the seat 110 of the retainer member 106 cooperates with the seat 96 of the support arm 98 to provide a socket for the drive-ball 100.

OPERATION

As explained in the aforementioned copending patent application of Hewko, the traction drive-ball 100 is preloaded with respect to the surface 102 of the race 76 and the peripheral surface 104 of the transmission output shaft 14 by virtue of the belleville spring-type wall 84 being sprung upwardly in FIG. 2 when mounted on the ball planets 80, when the guide ring 18 of the circular housing 16 is lowered into the side opening 20 of the case 12. The preloaded drive-ball 100 is thus frictionally confined at oppositely disposed points thereof for rotation between the above-mentioned surfaces 102 and 104 while retained in the spherical socket formed by the sperical seats 96 and 110 and their respective openings 94 and 108. The speed ratio of the rotary speed of the transmission output shaft 14 and that of the speedometer take-off shaft 64 is dependent upon the distance or radius between the axis of the take-off shaft 64 and the center of the drive-ball 100, i.e., the distance designated by the letter "R" in FIG. 2. Such distance "R", and hence, the resultant speed ratio of the respective shafts 14 and 64, as required for particular combinations of tire sizes and axle ratios, is variable between predetermined limits by manually loosening the screw 42 to thereby free the clamping device 26, and thereafter manually rotating the housing 16 in the counterbore 17 of the case 12 by inserting a suitable wrench or other tool in the ratio-adjustment holes 45 and rotating same, causing the axis of the take-off shaft 64 to move eccentrically, thereby changing the radius "R" with respect to the fixed center of the traction drive-ball 100. After the housing 16 is thus circumferentially repositioned, the screw 42 is once again threadedly secured in the threaded opening 44 in the housing 12, causing the ridges 30 and 32 of the clamping device 26 to bear down against the outer surface of the housing 16 and, in turn, engaging the housing 16 tightly against the radial flange 47 of the adapter plate 46. The latter is retained from rotating with the housing 16 by virtue of the bolt 42 being extended through the opening 60 of the tab 58 formed on the adapter plate edge.

Thus, it should be apparent that the speedometer drive construction of the subject invention provides an improved, efficient, and readily adjustable structural arrangement for selectively transferring a variable traction drive from the transmission output shaft to a speedometer take-off shaft.

While but one embodiment of the invention has been shown and described, other modifications thereof are possible.

I claim:

1. A speedometer drive construction comprising a transmission extension housing, a transmission output shaft extending through said extension housing, a circular opening formed in a side of said extension housing, a flat-bottom surfaced counterbore formed in said circular opening, an adapter plate including a body portion having a radial flange formed thereon, said radial flange being seated on the bottom surface of said counterbore and said body portion being confined freely within the inner peripheral surface of said circular opening, a circular speedometer drive housing having a concentric smaller diameter guide ring formed on the inner surface thereof, said circular housing being mounted in said counterbore and seated on said radial flange, with said guide ring being confined freely within said body portion of said adapter plate, a speedometer take-off shaft opening formed through said speedometer drive housing off-set from the center of said housing, means for manually rotating said speedometer drive housing formed in the outer surface of said drive housing in an equally-spaced relationship with said take-off shaft opening, a circular, bowed clamp having a pair of oppositely disposed tabs extending from the outer peripheral edge thereof and a pair of parallel ridges formed at the respective radially inner edges of said pair of tabs, an opening formed in one of said tabs, a slot formed in said extension housing, the other of said tabs being inserted in said slot, a retention tab formed on the outer peripheral edge of said radial flange of said adapter plate, an opening formed therethrough, a threaded opening formed in said extension housing, a bolt mounted through said opening formed in said one of said tabs of said clamp, through said opening formed in said retention tab of said adapter plate and threadedly secured in said threaded opening in said extension housing, thereby forcing said pair of parallel ridges into abutting engagement with said adjacent outer surface of said speedometer drive housing, a speedometer take-off shaft rotatably mounted in said take-off shaft opening, a flange-type carrier formed on an end of said take-off shaft within said extension housing, a plurality of ball planets mounted circumferentially around said carrier, a belleville spring-type upper race and a rigid bottom race mounted respectively above and below said ball planets, a reaction member secured at one end thereof to said body portion of said adapter plate and having a radially inwardly extending flat support arm extending from the other end thereof in a spaced-parallel relationship with said bottom race, an opening formed adjacent the inner edge of said support arm, and a drive-ball rotatably mounted in said support arm opening and maintained by said belleville spring-type upper race in a traction-drive relationship between said bottom race and said transmission output shaft, the distance between the center of said drive-ball and the axis of said take-off shaft being variable in response to manual rotation of said speedometer drive housing and, hence, of said take-off shaft mounted in said off-set take-off shaft opening formed in said drive housing.

2. A speedometer drive construction comprising a transmission extension housing, a transmission output shaft extending through said extension housing, a circular opening formed in a side of said extension housing, a flat-bottom surfaced counterbore formed in said circular opening, an adapter plate having a radial flange formed thereon and seated on the bottom surface of said counterbore, a first cylindrical portion formed on the inner peripheral edge of said radial flange and fitting freely within the inner peripheral edge of said circular opening, a circular speedometer drive housing having a concentric smaller diameter guide ring formed on the inner surface thereof, said circular housing being mounted in said counterbore and seated on said radial flange, with said guide ring fitting freely within said first cylindrical portion of said adapter plate, an extension formed on said speedometer drive housing off-set from the center thereof and extending from both faces thereof, a speedometer take-off shaft opening formed through said extension, a pair of oppositely disposed ratio-adjustment holes formed in the outer surface of said drive housing in an equally-spaced relationship with said extension, a circular, bowed clamp having a pair of oppositely disposed tabs extending from the outer peripheral edge thereof and a pair of parallel ridges formed at the respective radially inner edges of said pair of tabs, an opening formed in one of said tabs, a slot formed in said extension housing, the other of said tabs being inserted in said slot, a retention tab formed on the outer peripheral edge of said radial flange of said adapter plate, an opening formed therethrough, a threaded opening formed in said extension housing, a bolt mounted through said opening formed in said one of said tabs of said clamp, through said opening formed in said retention tab of said adapter plate and threadedly secured in said threaded opening in said extension housing, thereby forcing said pair of parallel ridges into abutting engagement with said adjacent outer surface of said speedometer drive housing, a speedometer take-off shaft rotatably mounted in said take-off shaft opening, a flange-type carrier formed on an end of said take-off shaft within said extension housing, a plurality of equally-spaced ball planets mounted in equally-spaced openings formed adjacent the outer peripheral edge of said carrier, a belleville spring-type upper race and a rigid bottom race mounted respectively above and below said ball planets, said upper race being secured at the center portion thereof to said speedometer drive housing and said rigid bottom race being free to rotate independently, a radially inwardly extending wall formed on said first cylindrical portion of said adapter plate, a second cylindrical portion formed on the inner peripheral edge of said wall and extending therefrom on the side opposite said first cylindrical portion, a reaction member including an arcuate flange secured at one end thereof to the inner surface of said second cylindrical portion, an off-set central portion formed on the free end of said arcuate flange for extending around and past the outer peripheral edges of said carrier and said upper and lower races, a radially inwardly extending flat support arm extending from said off-set central portion in a spaced-parallel relationship with said bottom race, a socket formed adjacent the inner edge of said support arm, and a drive-ball rotatably mounted in said socket and maintained by said belleville spring-type upper race in a traction-drive relationship between said bottom race and said transmission output shaft, the distance between the center of said drive-ball and the axis of said take-off shaft being variable in response to manual rotation via said ratio-adjustment holes of said speedometer drive housing and, hence, of said take-off shaft mounted in said off-set extension formed on said drive housing.

* * * * *